(12) United States Patent
Risley

(10) Patent No.: US 9,375,056 B1
(45) Date of Patent: Jun. 28, 2016

(54) SECURE FASTENER

(71) Applicant: Matt Risley, Phoenix, AZ (US)

(72) Inventor: Matt Risley, Phoenix, AZ (US)

( * ) Notice: Subject to any disclaimer, the term of this patent is extended or adjusted under 35 U.S.C. 154(b) by 149 days.

(21) Appl. No.: 14/120,892

(22) Filed: Jul. 8, 2014

(51) Int. Cl.
*A44B 17/00* (2006.01)

(52) U.S. Cl.
CPC .................................. *A44B 17/0011* (2013.01)

(58) Field of Classification Search
CPC .......... F16B 39/24; F16B 15/00; F16B 23/00;
F16B 39/00; A44B 17/0011
See application file for complete search history.

(56) References Cited

U.S. PATENT DOCUMENTS

| 916,995 | A | 4/1909 | Carr |
| 2,504,358 | A | 4/1950 | Swanson |
| 2,506,953 | A | 5/1950 | Dzus |
| 2,555,291 | A | 5/1951 | Poupitch |
| 4,313,371 | A | 2/1982 | Jackson |
| 6,769,853 | B2 | 8/2004 | Perrot |
| 6,868,590 | B2 | 3/2005 | Bentrium |
| 7,073,231 | B2 | 7/2006 | Draggoo |
| 7,971,841 | B2 | 7/2011 | Van Wyk |
| 8,047,594 | B1 | 11/2011 | Matthies |
| 8,162,091 | B2 | 4/2012 | Laperle |
| 2008/0197648 | A1* | 8/2008 | Smith ........................ 296/24.34 |
| 2012/0223067 | A1* | 9/2012 | Gaynor et al. ................ 219/438 |

* cited by examiner

*Primary Examiner* — Karabi Guharay
(74) *Attorney, Agent, or Firm* — Randal D. Homburg

(57) ABSTRACT

A quick connect fastener accessory includes a base plate and lid to enclose an upper end of a quick release pin or fastener, preventing disengagement of the fastener or quick release pin from its engagement and an illumination means integrated within the base plate and connected to a local available low voltage electrical system, the illumination means using low voltage LEDs with a prismatic backplate for maximizing illumination as an accent or as a visual aid.

5 Claims, 4 Drawing Sheets

SECURE FASTENER

CROSS REFERENCE TO RELATED APPLICATIONS

None.

BACKGROUND OF THE INVENTION

1. Field of Invention

A quick connect fastener accessory includes a base plate and lid to enclose an upper end of a quick release pin or fastener, preventing disengagement of the fastener or quick release pin from its engagement and an illumination means integrated within the base plate and connected to a local available low voltage electrical system, the illumination means using low voltage LEDs with a prismatic backplate for maximizing illumination as an accent or as a visual aid.

2. Description of Prior Art

A preliminary review of prior art patents was conducted by the applicant which reveal little if any prior art patents in a similar field or having similar use. However, the prior art inventions do not disclose the same or similar elements as the present illuminated secure fastener cover, nor do they present the material components in a manner contemplated or anticipated in the prior art.

The primary fastener used with the present secure fastener finds its origin with U.S. Pat. No. 2,506,953 to William Dzus, who invented a spiral turn quick fastener for use in attaching panels to an anchor panel, replacing rivets. Thus, the term Dzus fastener, quarter turn fastener or locking panel pin all define the type of fastener used with the secure fastener as disclosed in the present invention.

In U.S. Pat. No. 8,162,091 to Laperle, a multiple component device is disclosed which attaches a box or bag to a vehicle. A three wheeled motorcycle is disclosed as the subject vehicle, and the device includes a frame anchored to the bike and at least two body clips, noted as "quarter-turn clips 240, 244, similar to those adapting for use in the present invention, are illustrated. The present invention involves the same type clips. Several other prior art patent utilize these type clips, including U.S. Pat. No. 8,047,594 to Matthies, a detachable fender panel clip, U.S. Pat. No. 7,971,841 to Van Wyk, a saddlebag wall hanger using these type clips, U.S. Pat. No. 6,769,853 to Perrot, disclosing a clip which has a base accepting a quick fastener clip, U.S. Pat. No. 2,555,291 to Poupitch and U.S. Pat. No. 2,504,358 to Swanson.

SUMMARY OF THE INVENTION

Panel fasteners have been known in the art for several years, as disclosed above, eventually evolving to the quarter turn or quick application panel fasteners. These fasteners are known as body panel fasteners, trim fasteners, DZUS® fasteners or other trade or generic names. These pins insert primarily through a hole in the applied panel and attach through an aligned hole in an anchor component. Most of these fasteners insert through the aligned holes and are then secure through either rotation, generally a quarter turn, or by the driving of a vertical pin which expands a lower portion to prevent removal. In both instances, these fasteners have been known to unintentionally disengage by vibration or impact, which either causes the fastener to rotate, rip through, or makes the vertical pin back out. The present device is intended to prevent disengagement as a primary purpose. A second intended purpose is to provide an illumination means within the secure fastening device when the secure fastening device is placed in an interior application.

DESCRIPTION OF THE DRAWINGS

The following drawings are submitted with this utility patent application.

DESCRIPTION OF THE PREFERRED EMBODIMENT

Figure 1:
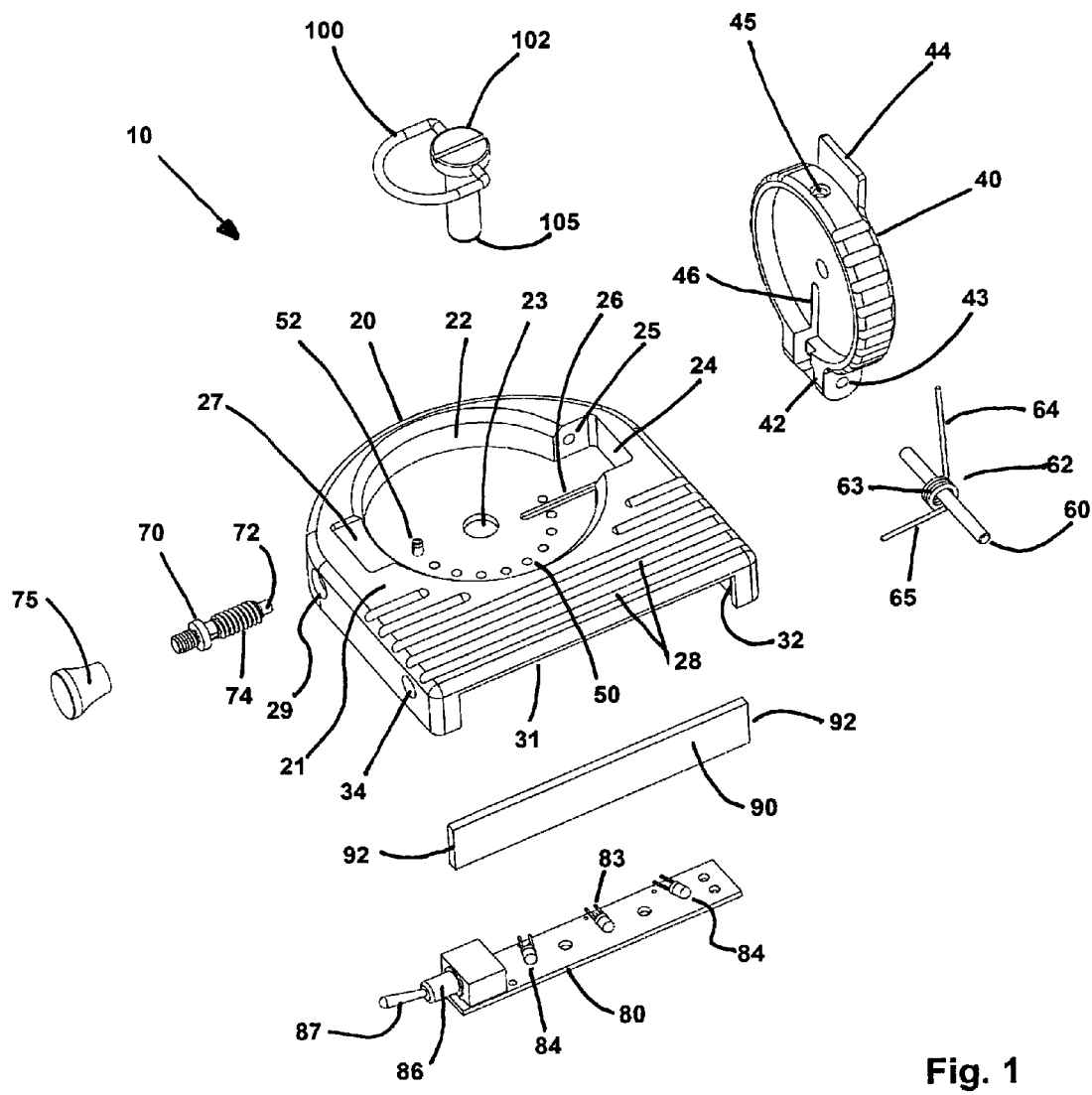
FIG. 1 is an exploded view of the components of the secure fastening device.

A secure fastener device 10 used with a quick fastener pin 100 generally defining a pin head 102 and a pin shaft 105, the fastener device 10, shown in FIGS. 1-4 of the drawings, the secure fastener device 10 comprising a base member 20, defining an outer surface 21 having a base recess 22 having a centrally located rear pin aperture 23, a plurality of spaced dowel holes 50 receiving at least one dowel pin 52, the base recess 22 further providing a lid anchor socket 24 including axially aligned pin holes 25, a spring indent 26, and a lid tab notch 27, a lateral release pin outlet 29 and a plurality of illumination slots 28, the secure fastener device 10 also defining an inner surface 30 providing an electrical panel cavity 31, outer panel slide grooves 92 and a toggle switch portal 34, a lid 40 defining a pivotal extension 42 fitted for pivotal insertion within the lid anchor socket 24 of the base member 20, the pivotal extension 42 further providing an axial bore 43, the lid further defining a lid tab 44, a lid lock orifice 45 and an inner spring indent 46, the axial bore 43 of the lid 40 pivotally attached within the lid anchor socket 24 through the axial pivot pin holes 25 by a lid pin 60, the lid pin 60 traversing a spring loop 63 of a pin spring 62, the pin spring 62 extending an upper spring arm 64 received with the inner spring indent 46 of the lid 40 and a lower spring arm 65 received within the spring indent 26 of the base recess 22, and a lid lock pin 70 defining an inner tip 72 extending through the lateral release pin outlet 29 into the base recess 22 and further extending into the lid lock orifice 45 when the lid 40 is closed, the lid lock pin 70 further defining a pin spring and anchor 74 engaged within the lateral release pin outlet 29 and extending an outer pin pull knob 75 to withdraw the inner tip 72 from the base recess 22 and lid lock orifice 45 to release the lid 40 from the base member 20 and also to engage the inner tip 72 within the lid lock orifice 45 to secure the lid 40.

A second embodiment of the secure fastener device 10 provides the same elements as the first embodiment, but additionally including an electrical panel 80 within the electrical panel cavity 31 of the base member 20, the electrical panel 80 secured within the electrical panel cavity 31 by a panel securing partition 90 having outer margins 92 fitted within the panel slide grooves 32, the electrical panel 80 defining low voltage connector tabs 82 attaching to wiring from a local low voltage electrical system of a vehicle or other low voltage power supply, the electrical connector tabs 82 further extending low voltage electrical wiring 83 attaching at least one low voltage light 84, preferably an LED light, the electrical panel further providing a low voltage toggle switch 86 attached to a toggle tab 87 which extends through the toggle switch portal 34 of the base member 20, the toggle switch 86 turning the at least one low voltage light 84 on or off, the light emitted by the at least one low voltage light 84 passing through the plurality of illumination slots 28 to illuminate the area outside the base member 20.

Figure 2:
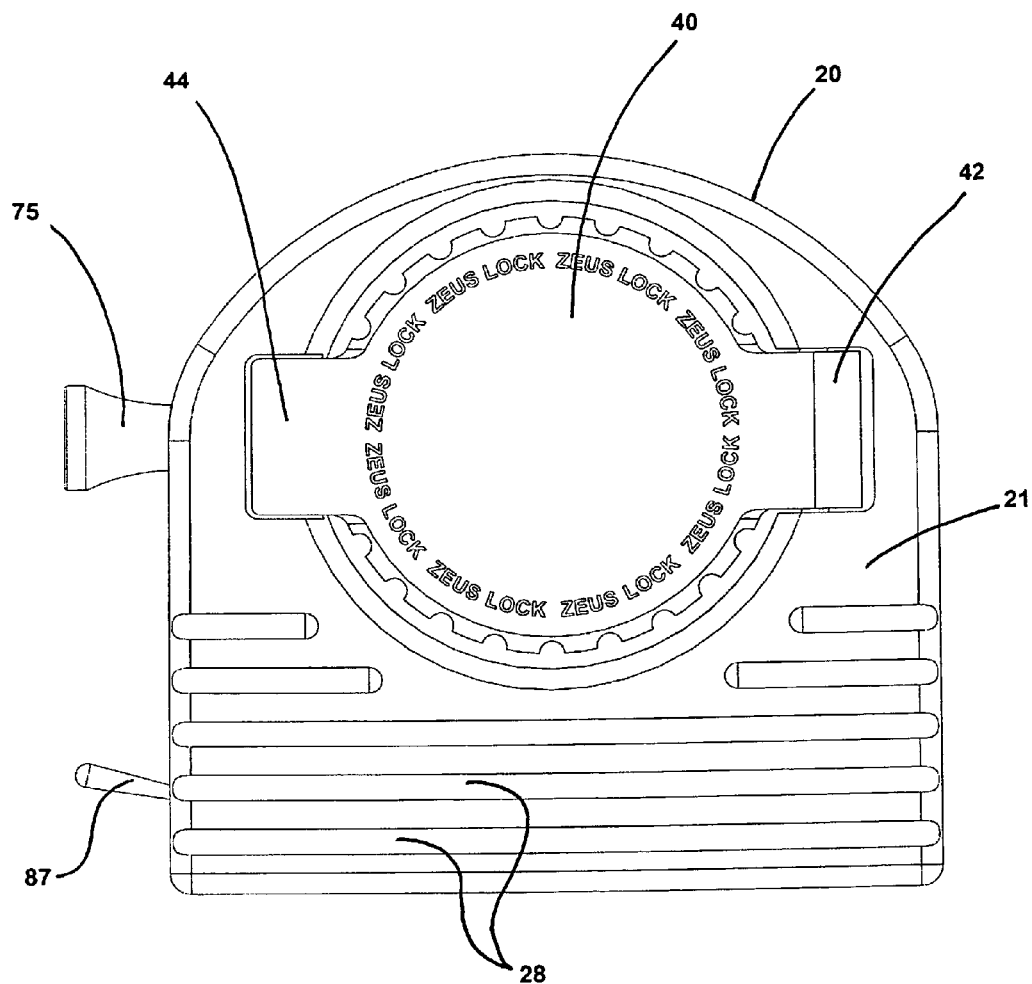
FIG. 2 is a top view of the secure fastening device in a closed position.
Figure 3:
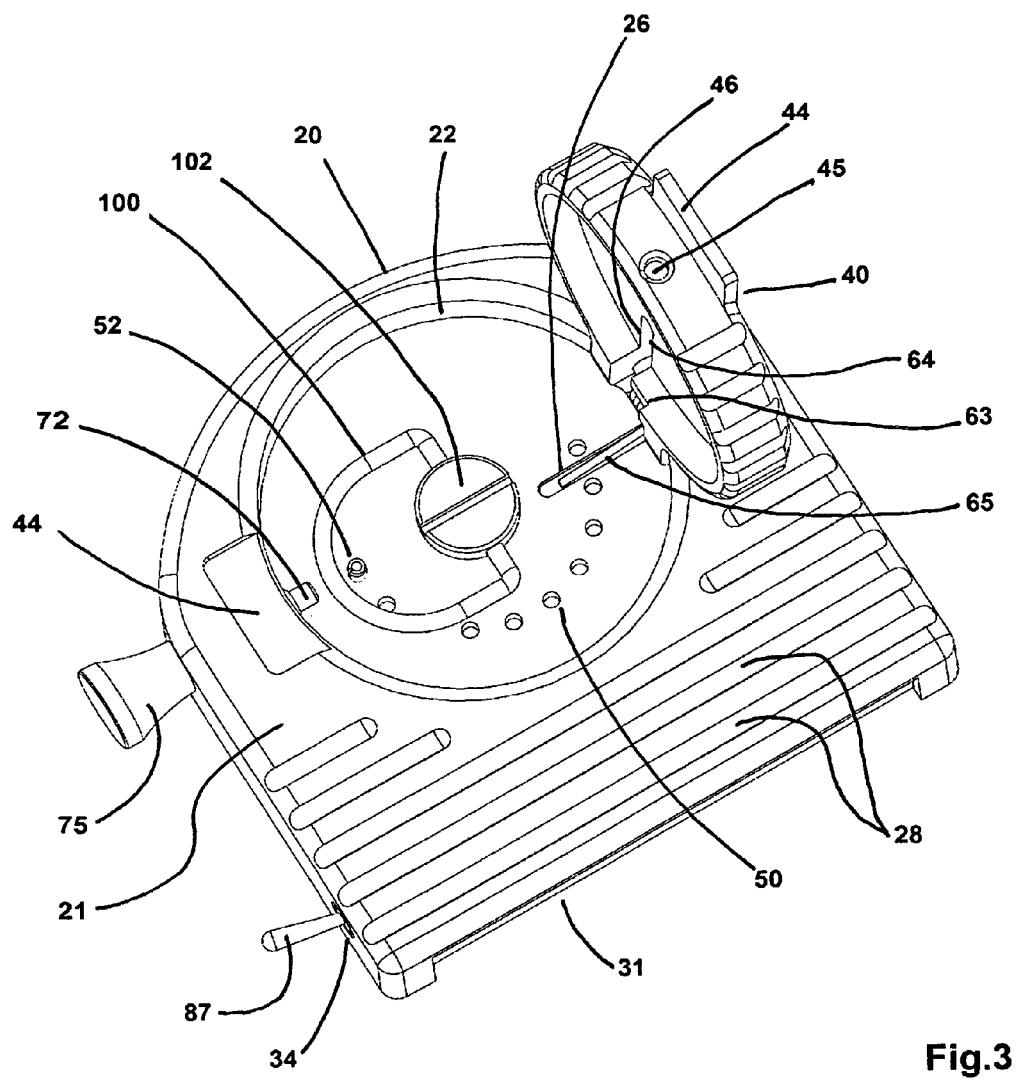
FIG. 3 is a perspective view of the secure fastening device in an open position exposing a quick fastener used with the secure fastening device.
Figure 4:
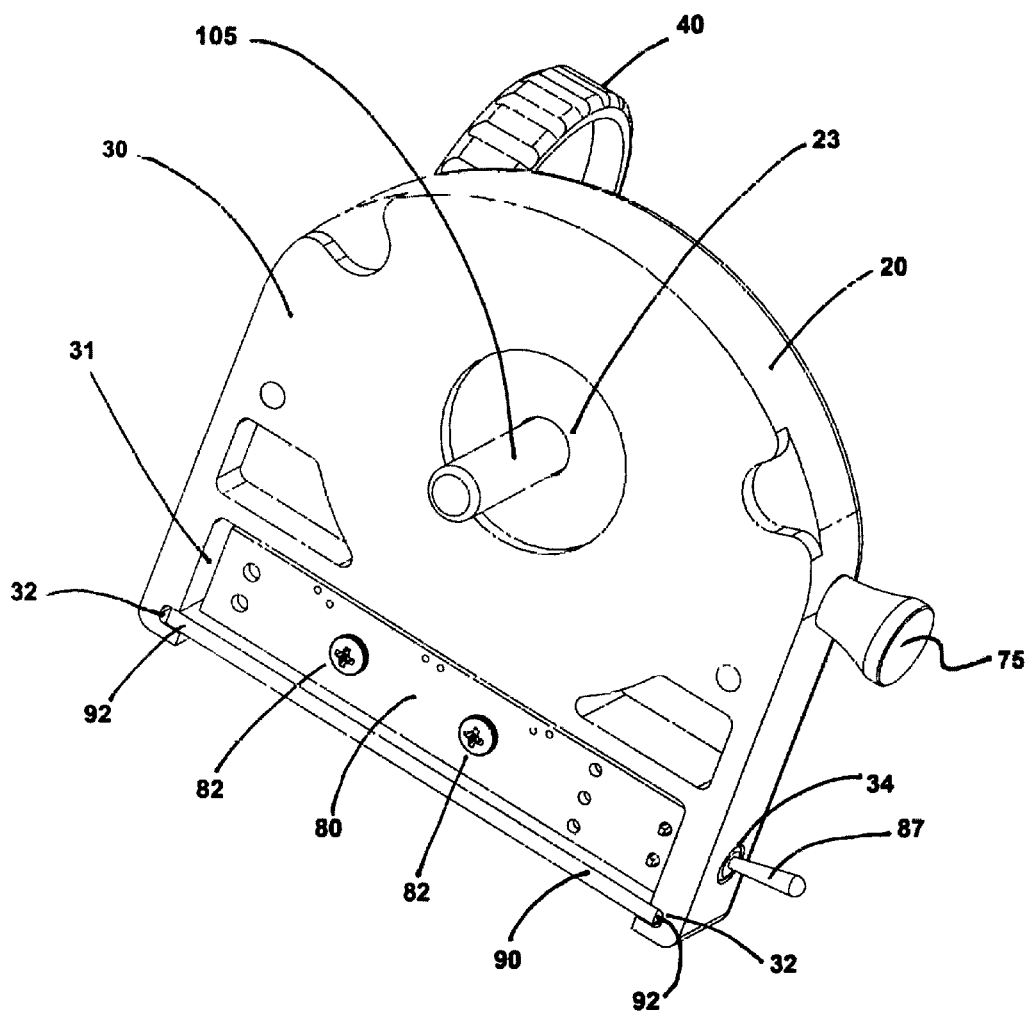
FIG. 4 is a rear view of the secure fastening device.

The lid 40 within the secure fastener device 10 in relationship to the base member 20 includes an open position, shown in FIGS. 3 and 4, and a closed position, FIG. 2. The lid is spring-loaded due to the inclusion of the pin spring 62 on the lid pin 60. When the lid lock pin 70 is retracted by pulling on the outer pin pull knob 75 to disengage the inner tip 72 from the lid lock orifice 45, the lid 40 springs open. The lid 40, once open, exposes the pin head 102 of the quick fastener pin 100 which projects the pin shaft 105 through the rear pin aperture 23 past the inner surface 30, the quick fastener pin 100 further performing its intended function to attach body panels together or to attach an object to a body panel. With the lid 40 open, the quick fastener pin 100 is exposed and can be applied or removed. Once the quick fastener pin 100 is installed as intended for use, the pin head 102 is further anchored to prevent movement or rotation through application of the dowel pin 52 within a selected dowel hole 50 blocking rotation of the pin head 102, shown in FIG. 3, and further secured by the closure and locking of the lid 40 within the base recess 22 of the base member 20 and the engagement of the inner tip 72 of the lid lock pin 70 within the lid lock orifice 45. In the closed position, FIG. 2, the lid 40 is fitted within the base recess 22 around its perimeter, with the lid tab 44 fitted within the lid tab notch 27, the lid 40 closed above the pin head 102 and prohibiting withdrawal or backing out of the quick fastener pin 100 from the secure fastener device 10.

A contemplated primary use of the illuminated embodiment of the secure fastener device 10 is the connection of a luggage bag or carrying container attached to a body panel or frame member of a vehicle, especially a two- or three-wheeled motorcycle or four wheeler. This application is shown in the prior art the multiple uses of quick fastener pins. As used in this specification and the subsequent claims, a quick fastener pin 100 is synonymous with quarter turn fasteners, quick connect pins, body panel fasteners, panel fasteners, DZUS® fasteners, and even pop rivets.

The present illuminated quick fastener device 10 was developed and is used to attach saddle bag luggage to a motorcycle. It has been demonstrated that no prior art quick connect fasteners incorporate an illumination device. It is also demonstrated that quick release fasteners as shown in the prior art have unintentionally disengaged and come loose from their anchor. The present secure fastener device 10 accomplishes several improved functions over any known prior art. First, the secure fastener device 10, when installed with a quick fastener pin 100, prevents the quick fastener pin 100 from being turned or moved after installation and closure of the lid 40 locked onto the base member 20. Second, the dowel pin 52 engaged within a appropriate dowel hole 50 stops rotation of the pin head 102 within the base recess 22. Third, where the secure fastener device 10 is used with the quick fastener pin 100 on the interior of the above example saddle bag luggage, the illuminated embodiment provides a source of illumination within the saddle bag luggage when the secure fastener device 10 is attached to the low voltage electrical system of the motorcycle by auxiliary low voltage wiring connecting the low voltage connector tabs 82 of the electrical panel 80.

Alternative suggested uses include using the secure fastening device with quick fastener pins in exposed application to excessive vibration, darkened compartment panel attachment uses, or high impact proximity panel attachments. Other uses will be evident to those who use quick connect fasteners.

While the secure fastener device has been particularly shown and described with reference to a preferred embodiment thereof, it will be understood by those skilled in the art that changes in form and detail may be made therein without departing from the spirit and scope of the invention.

What is claimed is:

1. A secure fastener device integrating a quick fastener pin, said secure fastener device comprising:
    a base member providing an outer surface having a base recess defining a centrally located rear pin aperture, a plurality of spaced dowel holes receiving at least one dowel pin, a lid anchor socket including axially aligned pin holes, a spring indent, a lid tab notch, and a lateral release pin outlet, and an inner surface;
    a lid defining a pivotal extension providing an axial bore, a lid tab, and a lid lock orifice, said axial bore of said pivotal extension of said lid pivotally attached within said lid anchor socket through said axial pivot pin holes by a lid pin, said lid securely fitting said base recess with said lid tab set within said lid tab notch is a closed position;
    a lock pin defining an inner tip extending through said lateral release pin outlet into said base recess and further extending into said lid lock orifice when said lid is in said closed position, said lid lock pin further defining a pin spring and anchor engaged within said lateral release pin outlet and extending an outer pin pull knob to withdraw said inner tip from said base recess and lid lock orifice to release said lid from said base member in an open position for access to said base recess and to attach said inner tip within said lid lock orifice to secure said lid, wherein said quick fastener pin defines an expanded pin head and a pin shaft, said pin shaft inserting through said rear pin aperture for said quick fastener pin's intended use, with said pin head retained and secured within said base recess when said lid is closed and expose for access when said lid is open.

2. The secure fastener device, as disclosed in claim 1, further comprising:
    a pin spring defining a spring loop through which said lid pin is inserted, said pin spring extending an upper spring arm received within an inner spring indent in said lid and a lower spring arm received within a spring indent within said base recess, providing said lid with a spring forced opening when said inner tip of said lid lock pin is withdrawn from said lid lock orifice of said lid.

3. The secure fastener device, as disclosed in claim 1, further comprising:
    said inner surface further defining an electrical panel cavity, outer margin panel slide grooves and a toggle switch portal;
    said outer surface defining a plurality of illumination slots from said outer surface through said inner surface and into said electrical panel cavity;
    an electrical panel providing a pair of low voltage connector tabs for connection to a local low voltage electrical system or power supply, said low voltage connector tabs further attaching low voltage wiring to at least one low voltage light, a toggle switch extending a toggle tab which is directed through said toggle switch portal, said toggle tab activating said toggle switch to illuminate said at least one low voltage light passing light through said plurality of illumination slots to illuminate an area outside said secure fastener device; and
    a panel securing partition retaining said electrical panel within said electrical panel cavity subsequent to insertion of outer margins of said panel securing partition locking within said outer margin panel slide grooves.

4. The secure fastener device, as disclosed in claim 1, further comprising:

said plurality of spaced dowel holes are located within said base recess in proximity to said pin head of said installed quick fastener pin, with said dowel pin placed in a selected dowel hole to prevent rotation, release and disengagement of said quick fastener pin.

5. The secure fastener device, as disclosed in claim 1, further comprising:

a pin spring defining a spring loop through which said lid pin is inserted, said pin spring extending an upper spring arm received within an inner spring indent in said lid and a lower spring arm received within a spring indent within said base recess, providing said lid with a spring forced opening when said inner tip of said lid lock pin is withdrawn from said lid lock orifice of said lid;

said inner surface further defining an electrical panel cavity, outer margin panel slide grooves and a toggle switch portal;

said outer surface defining a plurality of illumination slots from said outer surface through said inner surface and into said electrical panel cavity;

an electrical panel providing a pair of low voltage connector tabs for connection to a local low voltage electrical system or power supply, said low voltage connector tabs further attaching low voltage wiring to at least one low voltage light, a toggle switch extending a toggle tab which is directed through said toggle switch portal, said toggle tab activating said toggle switch to illuminate said at least one low voltage light passing through said plurality of illumination slots to illuminate an area outside said secure fastener device, and a panel securing partition retaining said electrical panel within said electrical panel cavity subsequent to insertion of outer margins of said panel securing partition locking within said outer margin panel slide grooves; and said plurality of spaced dowel holes are located within said base recess in proximity to said pin head of said installed quick fastener pin, with said dowel pin placed in a selected dowel hole to prevent rotation, release and disengagement of said quick fastener pin.

* * * * *